Figure 3:
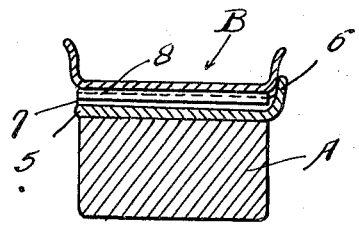

Dec. 2, 1924.
J. A. DICKENSON ET AL
1,517,828
DEMOUNTABLE RIM FOR VEHICLE WHEELS
Filed Sept. 17, 1923   2 Sheets-Sheet 1
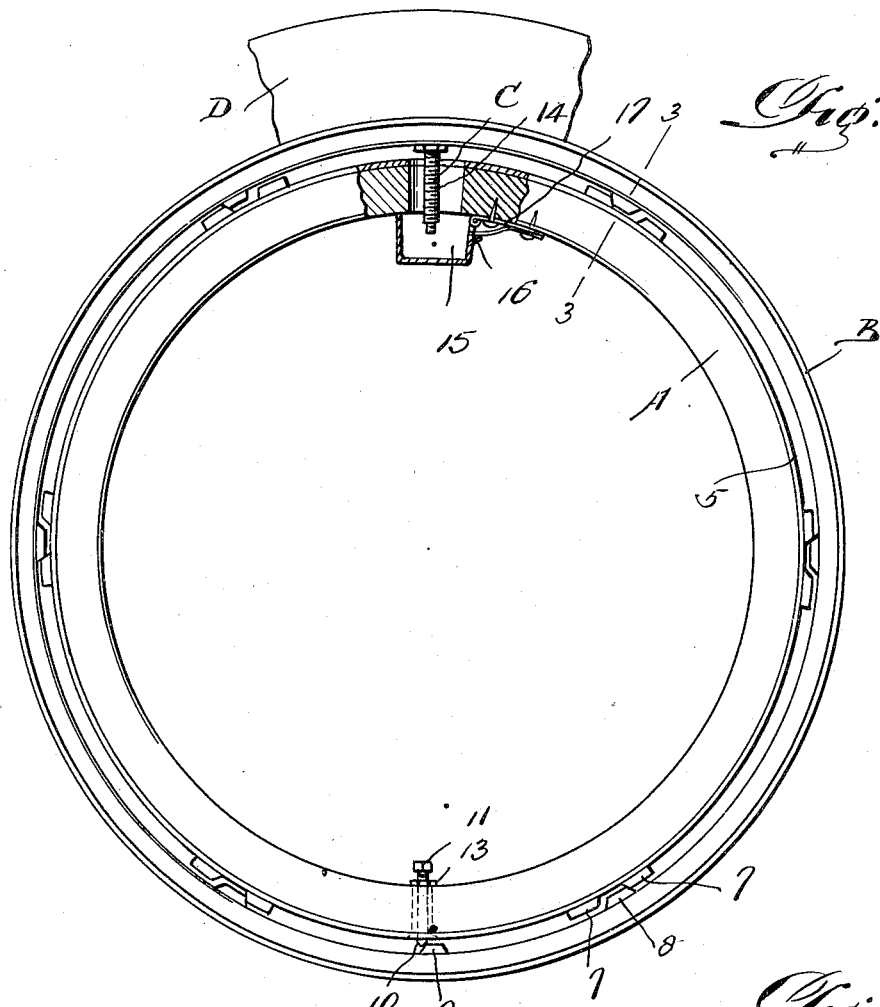
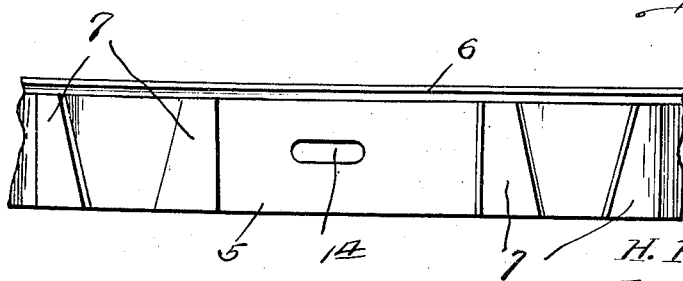
H. F. O'Hanlon
J. A. Dickenson,
Inventor Dec. 2, 1924.

J. A. DICKENSON ET AL 1,517,828

DEMOUNTABLE RIM FOR VEHICLE WHEELS

Filed Sept. 17, 1923   2 Sheets-Sheet 2

H. F. O'Hanlon
J. A. Dickenson
Inventor

Witnesses:

By Clarence O'Brien
Attorney

Patented Dec. 2, 1924.

1,517,828

UNITED STATES PATENT OFFICE.

JAMES ARTHUR DICKENSON AND HENRY FRANCIS O'HANLON, OF EDMONTON, ALBERTA, CANADA.

DEMOUNTABLE RIM FOR VEHICLE WHEELS.

Application filed September 17, 1923. Serial No. 663,150.

*To all whom it may concern:*

Be it known that we, JAMES ARTHUR DICKENSON and HENRY FRANCIS O'HANLON, citizens of the United States of America, residing at Edmonton, in the Province of Alberta, Dominion of Canada, have invented certain new and useful Improvements in Demountable Rims for Vehicle Wheels, of which the following is a specification.

In carrying out the present invention it is our purpose to provide a highly simplified and novel form of demountable rim for the wheels of a vehicle wherein these rims may be applied to or removed from the wheels in a simple and expeditious manner.

The primary object of the invention is to provide such a demountable rim wherein the same is maintained in positive engagement with the wheel without the necessity of employing the customary side lugs and fastenings it being only necessary in the application or removal of the rim to operate but a single means, this means comprising a bolt carried by the felly of the wheel and cam co-acting means on the bolt and rim.

A still further object of our invention is to provide such a demountable rim that is extremely simple in construction and one that may be manufactured and marketed at relatively small cost, the nature of the same being such as to permit of a successful commercial use.

With the above and other objects in view as the nature of the invention is better understood, the same comprises the novel form, combination and arrangement of parts set forth in the following specification, shown in the accompanying drawings and claimed.

In the drawings wherein like reference characters indicate corresponding parts throughout the several views, Figure 1 is a side elevational view, partly in section, of our improved rim applied.

Figure 4:
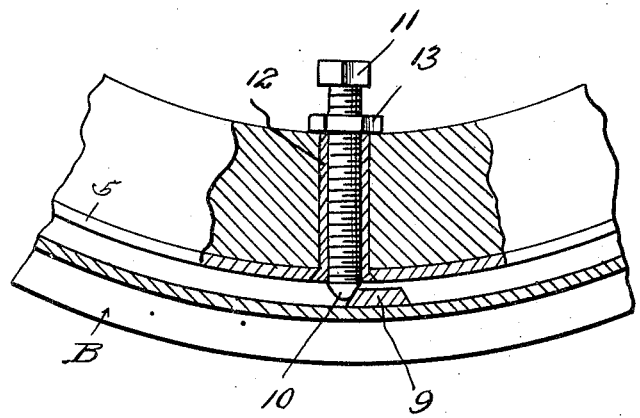
Figure 5:
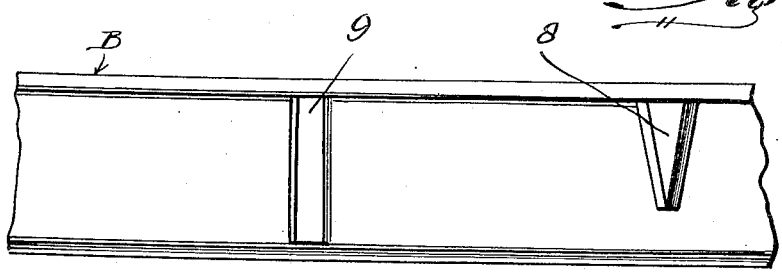

Figure 2 is a fragmentary plan view of the felly band of the vehicle wheel, this felly band in the present instance being equipped with a plurality of pairs of lugs for purposes presently to be brought out, Figure 3 is a detail cross sectional view taken substantially upon the line 3—3 of Fig. 1, Figure 4 is an enlarged fragmentary longitudinal section through a certain portion of the wheel more clearly disclosing the locking means between the wheel felly and my improved rim, and Figure 5 is a fragmentary plan view of the inner side of our improved rim.

Now having particular reference to the drawings, A designates the felly of a vehicle wheel and B our improved rim adapted for positioning thereon.

Upon the periphery of this felly A is a steel band 5 the inner edge thereof being flanged laterally as at 6 for providing an abutment or flange for limiting the inward sliding movement of the rim B upon said felly A. This band 5 is formed at circumferentially spaced points with pairs of lugs 7 the inner edges thereof diverging inwardly and away from each other to form a V-shaped space between said lugs, as more clearly shown in Fig. 2.

Formed upon the underside of the rim B are V-shaped lugs 8 the number of these lugs corresponding in number to the pairs of lugs 7 upon the steel band 5 of said felly A. As clearly shown in Fig. 5, the length of each of said lugs 8 is slightly less than the width of the rim, the same being adapted for disposition between the lugs of each pair 7 formed upon said steel band 5 in a manner as clearly shown in Fig. 1.

The opposite longitudinal edges of each of the lugs of the pairs 7 as well as the outer edges of the lugs 8 are beveled as shown and after the rim has been properly positioned upon the felly the same is rotated a slight degree for engaging one edge of each of the lugs 8 with an adjacent edge of the lug with which it coacts.

Formed upon said rim B is a transversely extending lug 9 the side edges of which are beveled as shown in Fig. 5, one side of which is adapted to be engaged by the beveled end 10 of a screw bolt 11 arranged within a screw-threaded sleeve 12 formed upon said steel band 5 and extending through a bore within said felly A. As a means for maintaining this bolt in adjusted positions a lock nut 13 is provided.

The rim B is formed with a slot 14 for allowing passage of the usual valve stem C of a tire D, the steel band 5 and felly A also being formed with alined openings more clearly shown in Fig. 1 for permitting of the passage of said valve stem therethrough. If desirable a protecting cup 15 that is hinged to the felly at 16 may be provided, this cup being normally forced into the position shown in Fig. 1 through the medium of a spring 17 and serving to prevent entrance of dust, dirt or moisture to said valve stem C.

It is to be understood that the distance between the outer edges of each of the lugs constituting the pairs 7 is slightly less than the inner or wide ends of the lugs 8.

With this structure it is obvious that the rim R can be disposed beside the flange on the felly of the wheel as is usually done, in applying a demountable rim. The lugs on the rim will be disposed opposite the narrow open ends of the lugs on the bend. With the parts in this position, the wide ends of the lugs 8 are passed through the narrow space existing between the outer ends of the lugs 7. The rim R is pushed into place against the stop flange 6. It is of course, understood that the parts will be so arranged that when they are positioned as just outlined, the bevelled outer ends of the bolt 11 will be disposed in operative position with the bevelled surface of the single lug 9, as is disclosed in Figure 1. The rotation of the bolt 11 in the proper direction will shift the entire rim circumferentially, bringing certain of the bevelled faces of the lugs 7 and 8 into engagement as seen. The rim is thus locked by friction against lateral displacement from the felly of the wheel.

Numerous advantages of a demountable rim of this character will be at once apparent to those skilled in the art and even though we have herein set forth the most practical embodiment of the invention with which we are at the present time familiar, it is nevertheless to be understood that minor changes may be made within the invention without departing from the spirit and scope of the appended claim.

Having thus described our invention what we claim as new and desire to secure by Letters Patent is:—

In combination, a felly band provided around one edge with a laterally disposed stop flange, a plurality of pairs of closely spaced lugs formed on the outer surface of said band, the opposed adjacent edges of each pair of lugs diverging inwardly and away from each other, to provide a substantially V-shaped space between each of said pairs, said divergent edges of the lugs being bevelled, a demountable channel shaped rim surrounding said band, said rim being provided on its inner surface with a plurality of circumferentially spaced V-shaped lugs fitting in the V-shaped spaces between said first named lugs, the opposite longitudinal edges of said second named lugs being bevelled for co-action with the bevelled edges of said other lugs, and cam co-acting means between said band and rim for shifting the latter circumferentially with respect to the band, whereby to bring certain bevelled edges of said lugs into frictional engagement with each other, to prevent lateral displacement of the rim from the band.

In testimony whereof we affix our signatures.

JAMES ARTHUR DICKENSON.
HENRY FRANCIS O'HANLON.